(No Model.)

G. D. ADAMSON.
BICYCLE PROPULSION.

No. 604,891. Patented May 31, 1898.

Witnesses
Emmett Leigh Wilson.
R. Hugh Rusk.

Inventor
George D. Adamson.

UNITED STATES PATENT OFFICE.

GEORGE D. ADAMSON, OF LOUISVILLE, KENTUCKY.

BICYCLE PROPULSION.

SPECIFICATION forming part of Letters Patent No. 604,891, dated May 31, 1898.

Application filed January 29, 1897. Serial No. 621,217. (No model.)

*To all whom it may concern:*

Be it known that I, GEORGE D. ADAMSON, a citizen of Great Britain, residing in the city of Louisville, Jefferson county, in the State of Kentucky, have invented a new and useful mechanical movement, whereby power, especially foot-power, is more advantageously used than at present, of which the following is a specification.

My invention relates to the improvement of propulsion in bicycles, tricycles, and other light vehicles which are driven by foot-power; and the object of my invention is to lessen the waste of energy by obviating the dead-point which is usually present in circular movement; also, by converting circular movement into lineal so shorten the distance covered for the work done as to increase speed, and also by placing machinery under dust-proof cover so reduce friction as to increase the durability of the moving parts, and, further, by a peculiar combination and application of levers so increase the power applied as to give greater speed than is now attained. I attain these objects by the mechanism illustrated in the accompanying drawings, in which—

Figure 1:
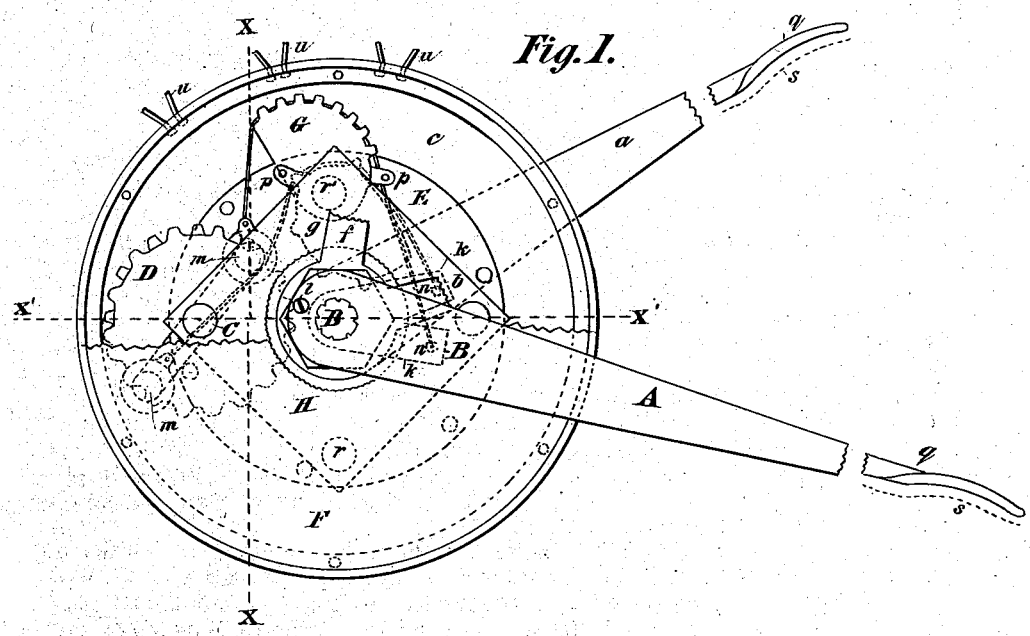
Figure 2:
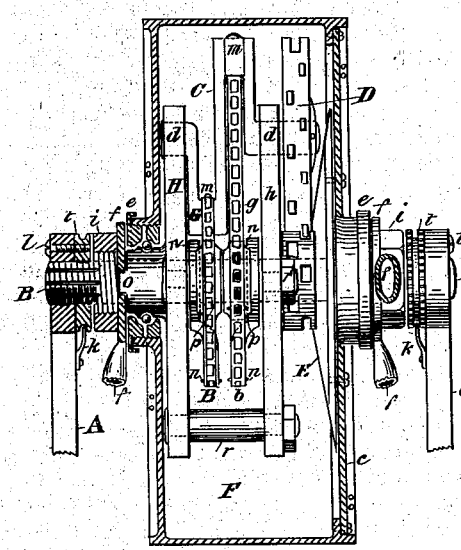
Figure 3:
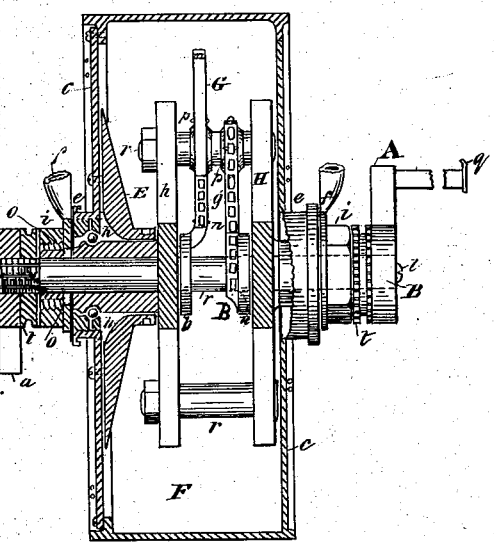

Figure 1 is an elevation of the entire movement as it would appear if applied to a bicycle. Fig. 2 is a plan view in section at X' X'. Fig. 3 is a part elevation view in section at X X.

Similar letters refer to similar parts throughout these views.

H h, securely fastened together by pins r' r r, forms the axle upon and within which the movement is carried, and it being clenched by jam-nuts i i to frame f f, which is held in position thereon by studs o o, becomes a fixed part of the said frame.

A a are levers, which are attached to B b immovably by fluted hole, as shown, tongue k, screw l, and nuts t t.

B b are crank-shafts within the axle H h and communicating through it with levers A a, to which they are made fast, as aforesaid.

C is a double-crank shaft moving freely within axle H h on bearings d d.

G g are cam or eccentric wheels having their bearings on r' and over which passes a chain or steel cord, one end of which is made fast to double-crank shaft C at m and the other to crank-shafts B b at n, all respectively. On the circumference of cams G g are teeth p p, which pass through chain or cord in order that said cams may move with the chain, and having passed through chain they are secured from returning by pins, as shown, in order that the chain may not ride.

D is a spur gear-wheel keyed to double-crank shaft C outside axle H h.

E is a mortise gear-wheel in mesh with spur gear-wheel D and made fast to c, which is flange of hub. The peculiarity about these gear-wheels is their double row of alternated teeth, the object being to get a steady bite and teeth broad enough to stand the strain of driving.

F is a hub having one flange c, to which is fixed mortise gear-wheel E detachable. Hub F c covers the entire movement and runs loosely on bearing e e, the balls of which run on axle H h.

t is a milled nut screwed onto crank-shaft B, drawing after it lever A, which slips on grooves, as shown, and is caught by k. By this nut adjustment of crank-shaft B is made, as well as the rigidity of lever A assured, for when t is in place, with tongue k of lever A in groove on its circumference, as shown, screw l is screwed home. Then lever A becomes a lock for nut t and nut t becomes a keeper for lever A.

It will now be seen that if power be applied at pedal q to lever A, with its fulcrum on crank-shaft B, to which it is fixed, crank-shaft B will move, and the fulcrum of crank-shaft B being in the center of axle H h it will impart movement to chain at n, which chain will carry with it cam G and transmit its movement to double-crank shaft C by bearing m. When double-crank shaft C moves, spur gear-wheel D, being keyed to it, moves and in moving moves mortise gear-wheel E, with which it is in mesh, and as mortise-wheel E is made fast to flange-wheel c of hub F hub F moves with it. Therefore movement of either lever A q or lever a q will produce movement of hub F, for they together form a pair of levers of similar movement. It will be seen in Fig. 1 that cam G being not at the bottom of stroke cam g has reached the top of stroke. To bring cam G to finish of stroke, lever A q will go to s. In so doing lever a q will be brought on its stroke to s. As this will be repeated every half-stroke, there is no dead-point in this movement.

Having thus set forth and explained my invention, I claim as new and desire Letters Patent for—

1. A mechanical movement comprising two shafts, levers fulcrumed on said shafts, a double-crank shaft mounted in proximity to said first-named shafts, a spur gear-wheel on said double-crank shaft, cam-wheels mounted at a point above said crank-shaft, chains connected to double-crank shaft and passing over the cam-wheels and attached to the levers, substantially as described.

2. The combination in a bicycle of shafts, levers fulcrumed on said shafts, a double-crank shaft mounted in proximity to said first-named shafts, cam-wheels mounted at a point above said crank-shaft, chains connected to the double-crank shaft and passing over the cam-wheels and attached to the levers, and the hollow axle having said first-named shafts mounted centrally, substantially as described.

3. The combination in a bicycle of shafts, levers fulcrumed on said shafts, a double-crank shaft mounted in proximity to said first-named shafts, a spur gear-wheel on said double-crank shaft, cam-wheels mounted at a point above said crank-shaft, chains connected to the double-crank shaft and passing over the cam-wheels and attached to the levers, the driving-hub and a gear-wheel suitably fastened to the inside of said driving-hub of bicycle, substantially as described.

4. The combination of crank-shaft, cam-wheel provided with keeper-tooth mounted in proximity to said crank-shaft, chain attached to said crank and passing over said cam-wheel engaging said keeper-tooth and oscillating lever to which the end of said chain is attached, substantially as described.

5. The combination of the nut t having a groove in its periphery, with a lever carrying a tongue k and screw l engaging said groove and nut, respectively, a shaft taking into said lever, the end of said shaft being threaded and longitudinally grooved, and the aperture in the lever being provided with longitudinal ribs corresponding to the grooves on the shaft, substantially as, and for the purpose specified.

6. A bicycle-hub comprising shell F, flange c suitably attached to said shell, spur gear-wheel securely fastened to inside said flange, and bearings e, e, substantially as described.

GEORGE D. ADAMSON.

Witnesses:
EMMETT LEIGH WILSON,
R. HUGH RUSK.